United States Patent
Lewis et al.

(10) Patent No.: US 10,245,926 B2
(45) Date of Patent: Apr. 2, 2019

(54) DEPLOYABLE TAILGATE STORAGE BAG FOR SUV

(71) Applicant: Bestop, Inc., Louisville, CO (US)

(72) Inventors: Stephen J. Lewis, Harrison Township, MI (US); Duane C. Junkin, Madison Heights, MI (US); Charles C. Turney, Toledo, OH (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/508,653

(22) PCT Filed: Sep. 3, 2015

(86) PCT No.: PCT/US2015/048318
§ 371 (c)(1),
(2) Date: Mar. 3, 2017

(87) PCT Pub. No.: WO2016/036939
PCT Pub. Date: Mar. 10, 2016

(65) Prior Publication Data
US 2017/0274745 A1    Sep. 28, 2017

Related U.S. Application Data

(60) Provisional application No. 62/045,197, filed on Sep. 3, 2014.

(51) Int. Cl.
*B60J 5/10* (2006.01)
*B60R 5/04* (2006.01)
(Continued)

(52) U.S. Cl.
CPC ............... *B60J 5/105* (2013.01); *B60R 5/04* (2013.01); *B60R 7/005* (2013.01); *B60R 7/02* (2013.01); *B60J 5/10* (2013.01)

(58) Field of Classification Search
CPC ............ B60R 2011/0082; B60R 7/005; B60R 2011/0028; B60R 7/02; B60R 7/08;
(Continued)

(56) References Cited

U.S. PATENT DOCUMENTS 5,031,808 A * 7/1991 Dolenc ................ B60R 7/046
224/280
5,121,958 A * 6/1992 Goeden ................ B60R 7/005
296/24.43

(Continued)

FOREIGN PATENT DOCUMENTS

DE         7112747 U     7/1971
DE       19714497 A1    10/1998
(Continued)

OTHER PUBLICATIONS

International Search Report for International Application No. PCT/US2015/048318, dated Nov. 11, 2015.

*Primary Examiner* — D Glenn Dayoan
*Assistant Examiner* — Sunsurraye Westbrook
(74) *Attorney, Agent, or Firm* — Warn Partners, P.C.

(57) ABSTRACT

A deployable storage assembly (10) having a mounting portion (12) and at least one base (14) hinged to the mounting portion (12) for deploying between an open position for storage and a closed position. At least one frame arrangement (22) is connected to the mounting portion (12) to allow the base (14) to rotate to the open position and hold the base (14) when opened to provide a storage compartment. The frame arrangement (22) provides the sides and front of the storage compartment, while the mounting portion (12) fixed to the vehicle provides the rear surface and the base (14) provides the bottom surface. A retaining device (26) coupled to the frame arrangement (22) and base (14) contains items within the storage compartment. At least one fastener (28) is connected to the mounting portion (12) for (Continued)

selectively holding the at least one base (14) in a closed/stowed position. Undoing the at least one fastener (28) allows the base (14) to fold down to the open position providing storage space.

20 Claims, 7 Drawing Sheets

(51) Int. Cl.
 *B60R 7/00* (2006.01)
 *B60R 7/02* (2006.01)
(58) Field of Classification Search
 CPC ....... B60R 7/082; B60R 11/0241; B60N 3/08; B60N 3/104
 USPC ........... 296/37.8, 37.13, 37.16, 37.6, 64, 75; 224/401, 511; 29/428, 453, 525, 527.1; 49/374, 394, 414, 449, 506
 See application file for complete search history.

(56) References Cited

U.S. PATENT DOCUMENTS

| | | | | |
|---|---|---|---|---|
| 5,535,931 | A * | 7/1996 | Barlow | B60R 7/02 224/403 |
| 6,502,885 | B1 * | 1/2003 | Gammon | B60N 3/08 224/401 |
| 6,874,667 | B2 * | 4/2005 | Dykstra | B60R 5/04 224/275 |
| 7,311,356 | B2 * | 12/2007 | Pudney | B60R 7/043 297/188.01 |
| 2009/0026197 | A1 * | 1/2009 | Chou | A45C 7/0036 220/9.2 |
| 2009/0288787 | A1 * | 11/2009 | Yoshida | B60R 5/047 160/351 |

FOREIGN PATENT DOCUMENTS

| | | |
|---|---|---|
| DE | 20019462 U1 | 2/2001 |
| WO | 9741755 A1 | 11/1997 |

\* cited by examiner

DEPLOYABLE TAILGATE STORAGE BAG FOR SUV

CROSS-REFERENCE TO RELATED APPLICATIONS

This application is a National Stage of International Application No. PCT/US 2015/048318, filed Sept. 3, 2015, which claims the benefit of U.S. Provisional Patent Application No. 62/045,197, filed Sep. 3, 2014. The disclosures of the above applications are incorporated herein by reference.

FIELD OF THE INVENTION

The present invention relates to a storage assembly with a rotatable base structure for use in automotive applications.

BACKGROUND OF THE INVENTION

Sport utility vehicles (SUVs) and pickup truck tailgates generally provide access to the back storage area of the SUV or truck. Typically, any items to be stowed in the rear section of the SUV/truck have little containment and have a tendency to roll around and become displaced. Items become difficult to find and to reach in the storage area as they roll forward and/or possibly become trapped within the passenger compartment. SUVs and pickup truck tailgates are also known to have little to no functionality, other than to provide access to the storage area/cargo bed. There are a few known ways to store items in the rear section of an SUV such as bulk containers and bags, which take up space when not in use and are not easily stowed, and nets, e.g., unstructured nets, fixed or attachable in the storage area, which have limited volume for storage and allows other items to get caught on or become entangled when loading items into the storage area or from items moving during transit, e.g., when the nets are not in use.

Accordingly, there is a desire for a deployable storage assembly that provides containment of items when deployed, but is stowable out of the way to return the storage area to near the original cargo area volume.

SUMMARY OF THE INVENTION

The present invention is directed to a deployable storage assembly having a mounting portion and having at least one base that is rotatably connected to the mounting portion at hinges for deploying to an open position to provide a storage compartment. At least one frame arrangement is operably connected to the mounting portion at a plurality of joints and is configured to rotate about the joints to allow the base to rotate to the open position. The frame arrangement also provides the sides and front of the storage compartment, while the fixed mounting portion provides the rear surface of the storage compartment and the base provides the bottom surface. A retaining device is operably coupled to the frame arrangement and the at least one base to contain items within the storage compartment area. At least one fastener, preferably, at least two fasteners are connected to the mounting portion for selectively holding the at least one base in a closed/stowed position. Undoing the at least one fastener allows the base to fold down to the open position for storage. When not in use the at least one base and frame arrangement with the retaining device rotates to a closed position against the mounting portion and the fastener(s) is/are engaged by an operator to hold the at least one base closed. The deployable storage assembly contains items in the rear of the SUV/truck while maintaining full tailgate functionality. The assembly provides easy to access location of stored items, and, when collapsed, maintains original cargo area volume.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-8 generally, wherein like numbers refer to like parts, the deployable storage assembly of the present invention provides containment of items in the rear of an SUV while maintaining full tailgate functionality. This provides easy to access location of stored items. When collapsed, the deployable storage assembly maintains original cargo area volume. This provides significant advantages over conventional storage solutions where stored items in the rear section of an SUV have little containment and have a tendency to roll around and become displaced, and where items also become difficult to find and to reach as they roll forward, e.g., possibly becoming trapped within the passenger compartment. A base of the assembly also provides a smoother more durable hard surface to prevent damage and cargo tangling or catching on the assembly when in the stowed position, which is yet another significant advantage over conventional systems.

Figure 5:
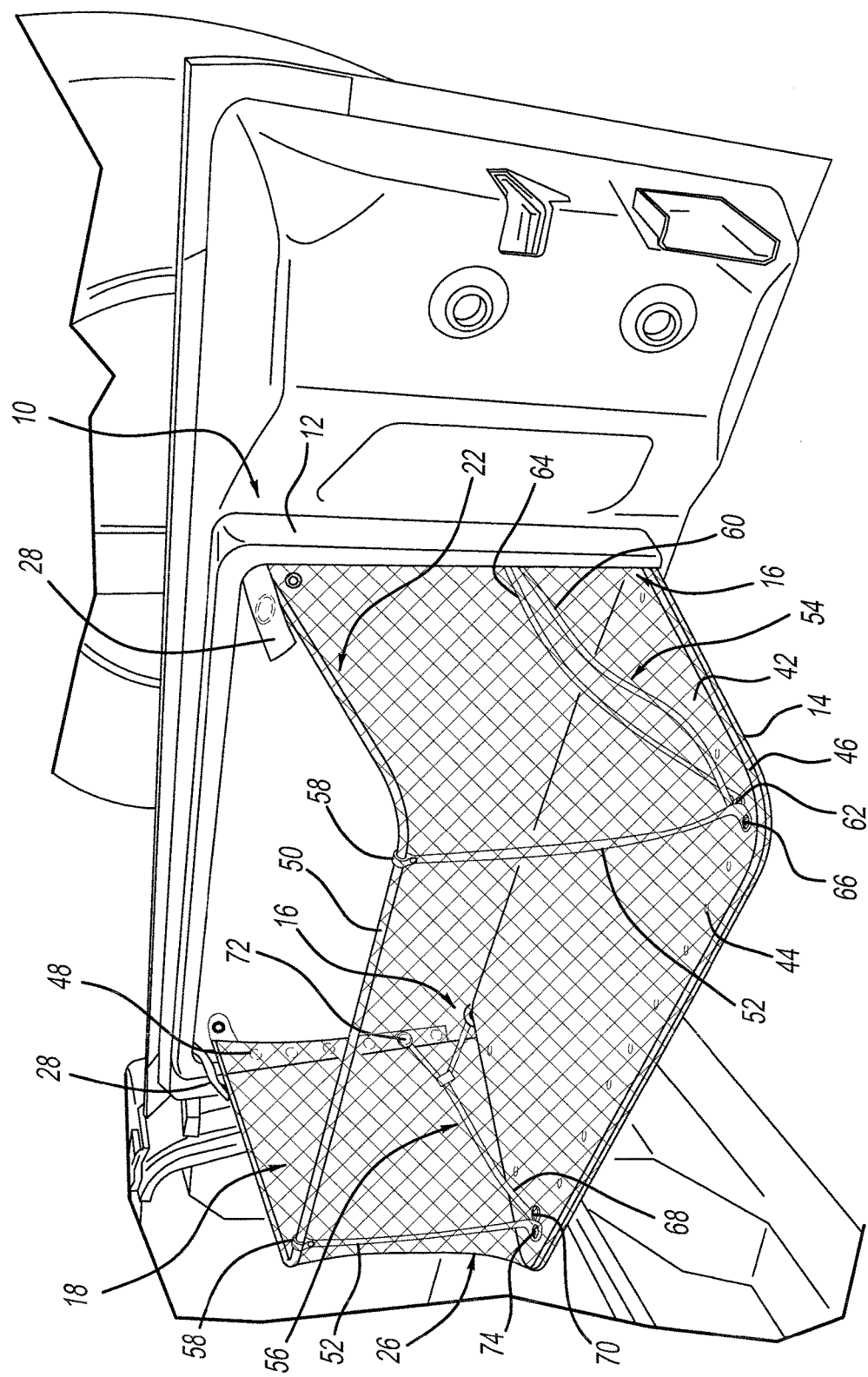
FIG. 5 is a perspective view of the deployable storage assembly in the open position on the tailgate of the vehicle according to an embodiment of the present invention.
Figure 6:
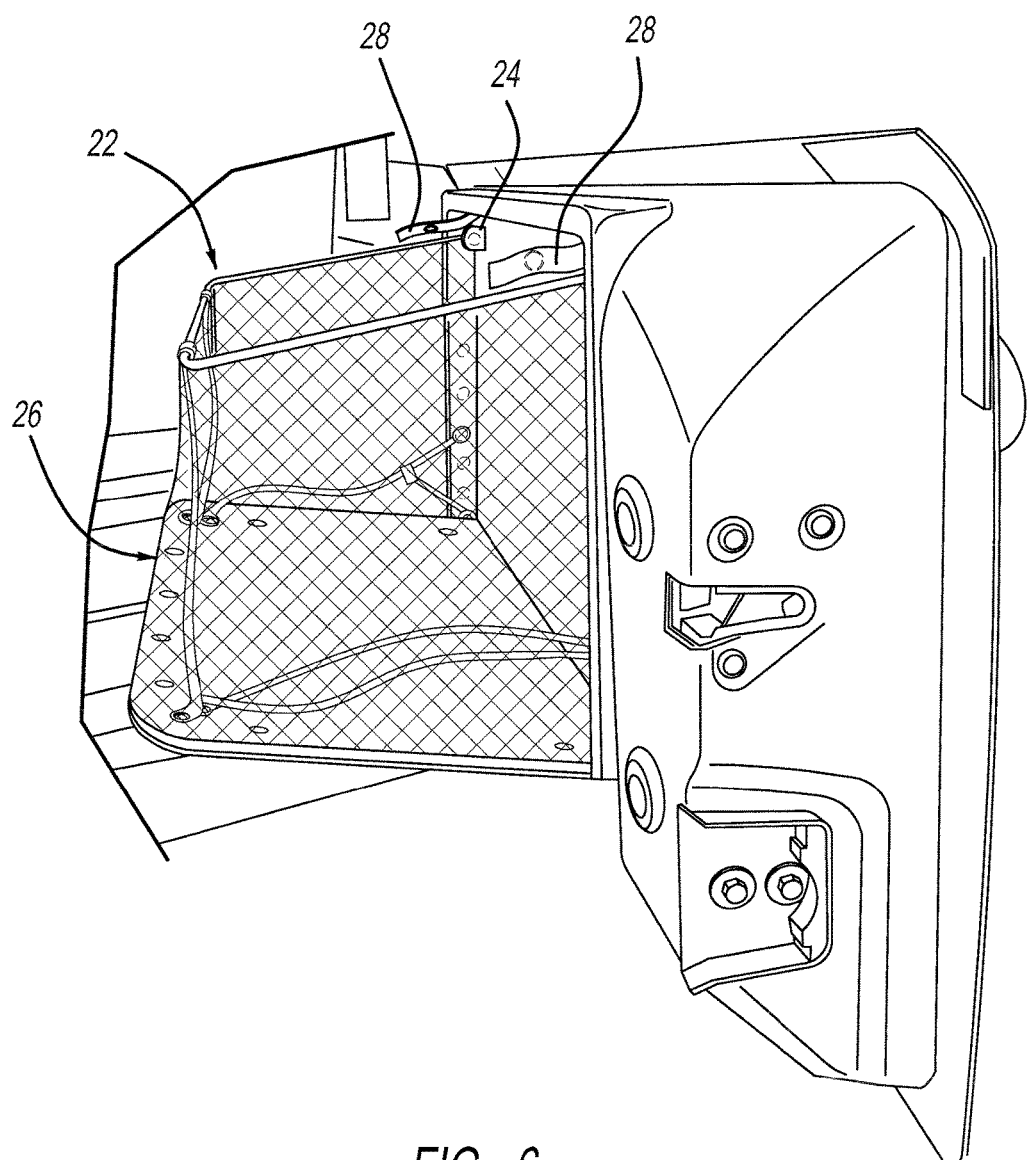
FIG. 6 is a side elevation view of the deployable storage assembly in the open position on the tailgate of the vehicle, in accordance with the present invention.
Figure 7:
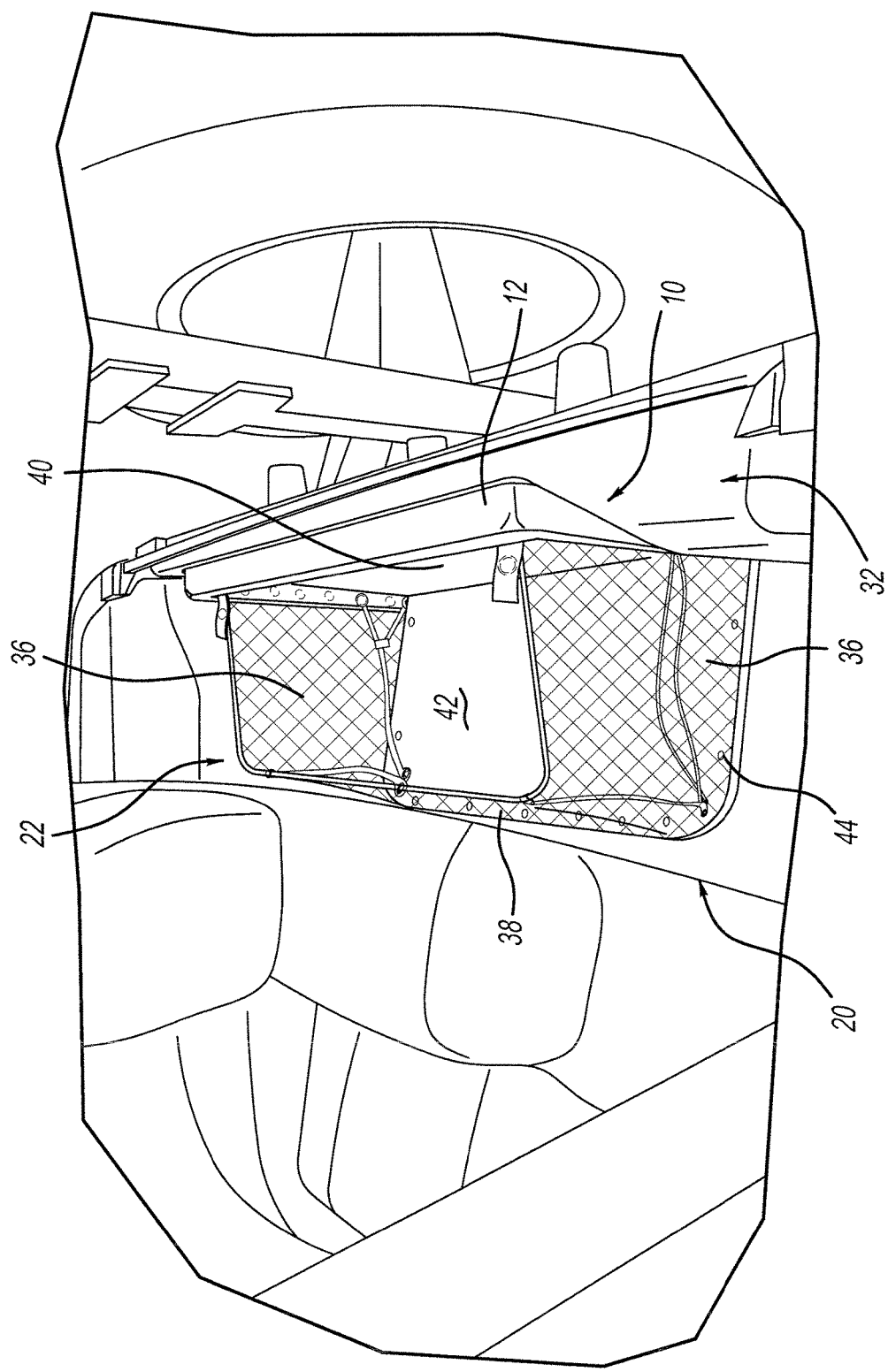
FIG. 7 is a perspective view of the deployable storage assembly shown in the open position within a storage area of the vehicle with the tailgate of the vehicle closed, in accordance with the present invention.

There is provided a deployable storage assembly shown generally at 10 operable for attachment to a vehicle 8 according to the present invention. The deployable storage assembly 10 has at least one mounting portion 12 and at least one base 14 that is rotatably connected to the mounting portion 12. The base 14 is hinged in at least two locations, e.g., pair of hinges shown generally at 16, for folding the assembly open and closed. The mounting portion 12 and base 14 are adapted for attachment to the pair of hinges 16 which can be any hinge arrangement suitable for predetermined cycling and durability requirements. The rotatably connected base 14 is deployable between an open position and a closed position. The open position provides a storage compartment shown generally at 18 (FIGS. 5-6). The closed position or "stowed" position eliminates the storage but maximizes space in the cargo/storage area of the SUV shown generally at 20 (FIG. 7).

Depending on the application the hinges are bolted, screwed, welded, riveted, secured with adhesive and/or epoxy, combinations thereof or otherwise connected to the mounting portion 12 and base 14 and/or framing depending on the application. Alternatively, molded-in panel features which are used to attach to opposing features and/or in combination with at least one fastener for each hinge or the like may be used to pivotally secure the base 14 to the mounting portion 12 and allow deployment of the base 14.

At least one frame arrangement indicated generally at 22 (FIGS. 5-7) is operably connected to the mounting portion 12, e.g., at a plurality of joints 24 creating pivot points (FIG. 6), and is configured to rotate about the joints 24 to allow the base 14 to rotate to the open position. Preferably, the right side is a mirror image of the left side. In this embodiment the joints 24 are provided on brackets, most preferably, metal brackets, e.g., a pin and bracket arrangement. Molded bosses or other mounting arrangement for providing a pivotable connection are also contemplated without departing from the present invention.

At least one retaining device generally shown at 26 is operably coupled to the frame arrangement 22 and the at least one base 14 to contain items within the storage compartment area. At least one fastener 28 selectively holds the base 14 in the closed position, and, when released allows the retaining device 26 to be deployed.

The retaining device 26 is netting, canvas, vinyl, fabric or any other lightweight material suitable for providing sides and a front that are collapsible when the base 14 is folded up into the closed position. Most preferably, the retaining device 26 is netting, generally such as that depicted in the Figures.

Generally, the retaining device 26 coupled to the frame arrangement 22 provides at least the sides 36,36 and front 38 of the storage compartment 18. Optionally, the retaining device 26 has a rear surface and/or bottom surface operably connected to the mounting portion 12 and base 14 forming the rear and/or bottom of the storage compartment 18. The fixed mounting portion 12 generally provides the rear surface 40 of the storage compartment 18. Optionally, the base 14 provides a bottom surface of the storage compartment 18.

The bottom surface 42 (FIG. 7) of the storage compartment 18 is operably connected to at least the sides 36,36 and front 38 of the retaining device 26 to prevent large gaps in the storage compartment 18. Alternatively, the bottom surface 42 is integrally formed with the sides 36,36 and front 38. Preferably, the bottom surface 42 is a thin layer of material, e.g., plastic sheet and/or fabric and/or other suitable lightweight material, operably fastened by a second plurality of fasteners 44, e.g., rivets, to the inside surface of the base 14, and, in this embodiment, a bottom layer 46 of the retaining device 26 is sandwiched between the base 14 and bottom surface 42 (FIG. 5). According to this embodiment the bottom surface 42 and/or bottom layer 46 is operably coupled, e.g., sewn and/or threaded/looped, to the front 38 and/or sides 36,36 of the retaining device 26.

The sides 36,36 of the retaining device 26 are operably connected to the mounting portion 12 by a third plurality of fasteners 48, on and/or adjacent to the rear surface 40, to prevent large gaps in the storage compartment 18. Alternatively, the sides 36,36 are integrally formed and/or connected with the rear surface 40, which in this alternative embodiment is a thin layer of material operably fastened to the mounting portion 12. It is understood that other second and third plurality of fasteners are contemplated without departing from the scope of the invention.

The least one fastener, preferably, at least two fasteners 28, are operably connected to the mounting portion 12 for selectively holding the at least one base 14 in the closed/stowed position. Most preferably, the at least two fasteners are each a strap with a snap, e.g., snap fastener buttons/eyelet/socket, that connects to the other half of the snap fastener 29 (FIG. 2) connected to the outward surface of the base 14. Undoing the fasteners 28, e.g., strap/snaps, allows the base 14 to be folded down to the open position for storage of items. When not in use the at least one base 12 and frame arrangement 22 with the retaining device 26 rotate/collapse up to the closed position against the mounting portion 12 and the fasteners 28 are snapped by an operator to hold the base 14 closed. It is understood that other fasteners are contemplated without departing from the scope of the invention.

The deployable storage assembly 10 is operable mounted to the interior facing surface of the tailgate, preferably, by operably mounting the mounting portion 12 to a metal frame 30 of the tailgate indicated generally at 32 (FIG. 3) with a fourth plurality of fasteners. In a most preferred embodiment, a back surface of the mounting portion 12 is operably connected to a manufacturer's molded part fixedly located on the tailgate 32. By way of example, drilled or pre-drilled apertures are provided in the molded part and the plurality of third fasteners operably connect the mounting portion 12 to the molded part of the tailgate 32 via these apertures.

It is understood that additional locations for mounting to within the storage area 20 or others are contemplated, e.g., mounting to the frame and/or thermoplastic panels on the sides of a pickup truck bed and/or extended cab SUV, etc.

The mounting portion 12 and base 14 are molded, preferably, of lightweight molded plastic or other suitable lightweight material. This is a significant advantage in keeping the amount of added weight to the tailgate 32 and vehicle 8 lower and reducing production and material costs, in particular, as compared to steel.

Referring to FIGS. 5-7 generally, features of the frame arrangement 22 operably freely rotate allowing the deployable storage assembly 10 to move between the open and closed positions.

The frame arrangement 22 has at least one upper member 50 or "top rail" that is curved, pair of vertical members 52 or "vertical rods" that are curved, a first side portion indicated generally at 54 and a second side portion indicated generally at 56 that are curved. The upper curved member 50 is pivotably connected to the pair of joints 24 toward both ends of the curved member 50. The pair of vertical members 52 are operably connected to the upper curved member 50, e.g., ring-like attachment features 58, generally forming vertical front edges of the storage compartment 18. The first side portion 54 has at least one member 60, e.g., metal rod, that at one end is operably connected to, or integrally formed with, one of the vertical members 52. This vertical member 52 is connected to the bottom surface 42 and base 14 by a fifth fastener 62. The other end of the member 60 is operably connected to the mounting portion 12 with at least one fastener. Preferably, the first side portion 54 also has a second member 64, e.g., a metal rod and/or cord or tether, that at one end is operably connected to the bottom surface 42 and base 14 by a sixth fastener 66, e.g., a metal rod, cord and/or tether, operably connected to the bottom surface 42 and base 14 by a sixth fastener 66. The other end of the second member 64 is operably connected to the mounting portion 12 with at least one fastener.

The second side portion 56 has at least a third member 68 e.g., a metal rod, cord and/or tether, that at one end is operably connected to the bottom surface 42 and base 14 by a seventh fastener 70. The other end of the third member 68 is operably connected to the mounting portion 12 with at least one fastener 72 and/or to the hinge bracket. Preferably, the second portion 56 additionally has another member identical to the first side. This vertical member 52 is connected to the bottom surface 42 and base 14 by an eighth fastener 74.

Figure 8:
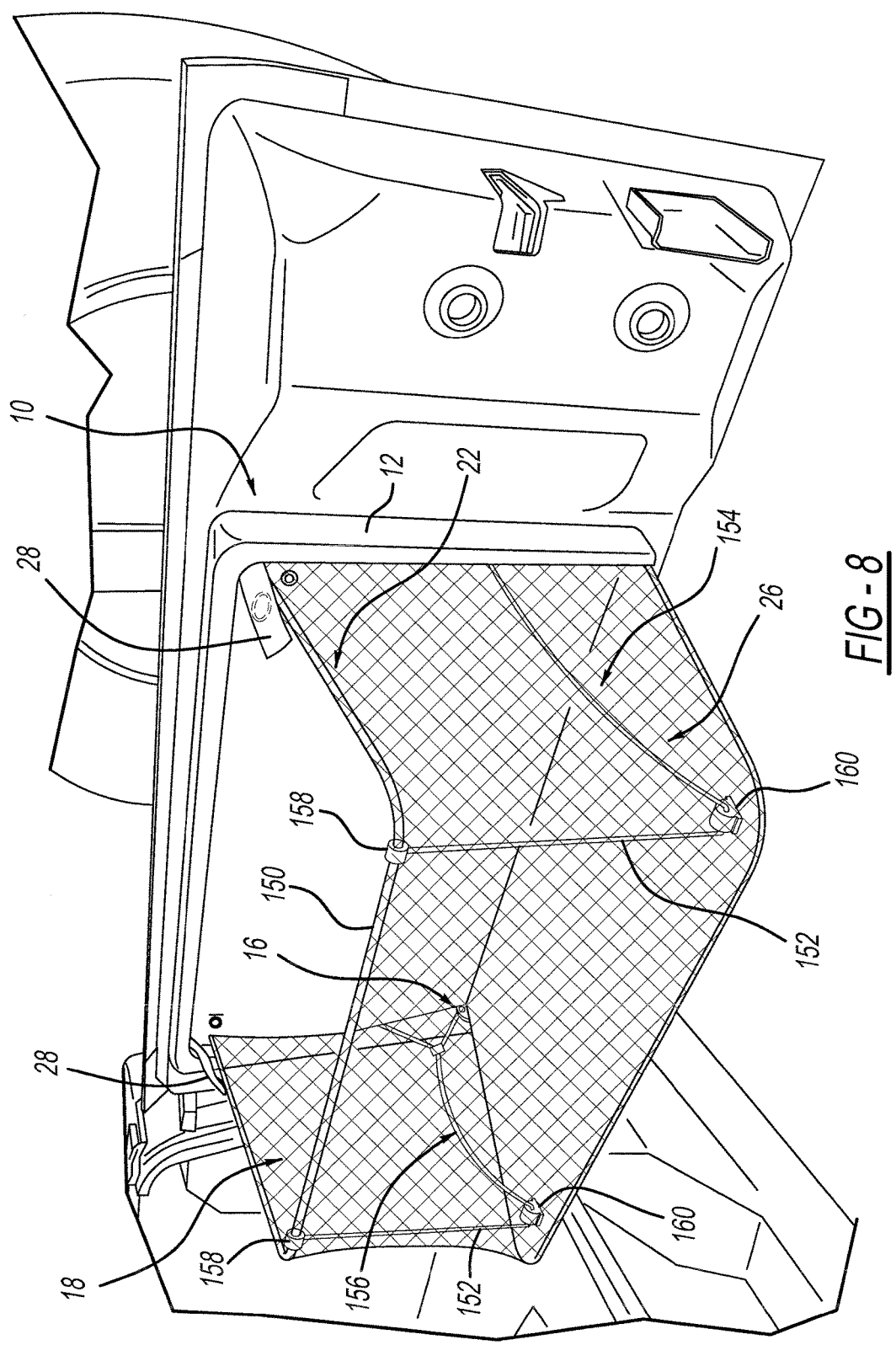
FIG. 8 is a perspective view of the deployable storage assembly in an open position on the tailgate of the vehicle according to another embodiment of the present invention.

Referring to FIG. 8, wherein like numbers indicated like parts, the frame arrangement indicated generally at 22 incorporates bosses in accordance with another embodiment. A first side portion indicated generally at 154 and a second side portion indicated generally at 156 that are curved are rods that go into bosses 160 and rotate freely, e.g., molded bosses. Second bosses 158, e.g., metal or molded bosses, are provided on the top rail 150 or "upper member" and the vertical rods 152 or "vertical members" are inserted into the second bosses 158.

Figure 1:
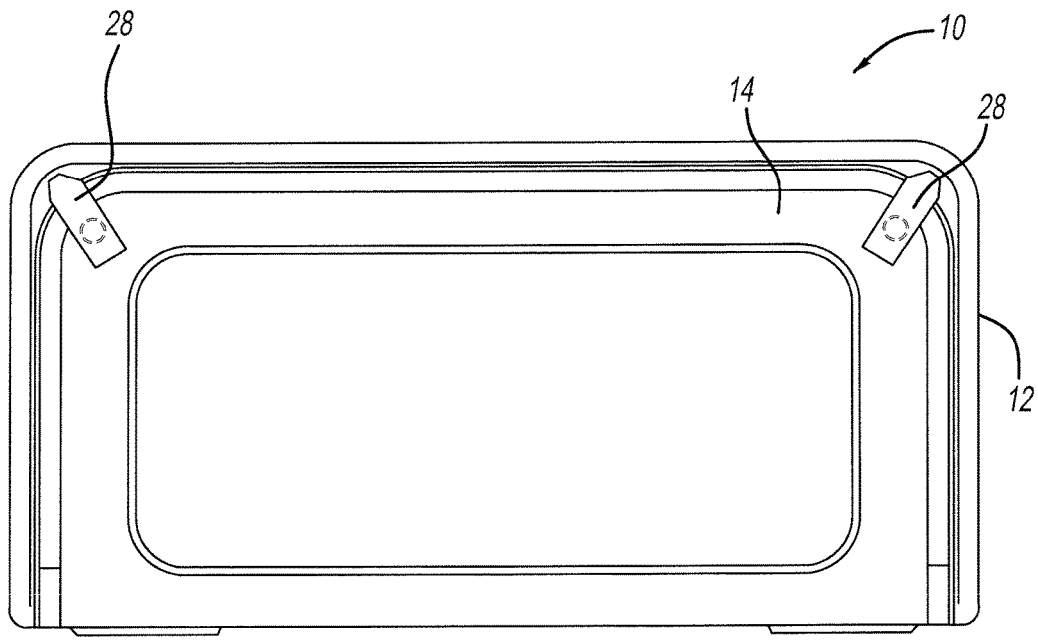
FIG. 1 is a front elevation view of a deployable storage assembly in a closed position but uninstalled on a tailgate of a vehicle, in accordance with the present invention.
Figure 2:
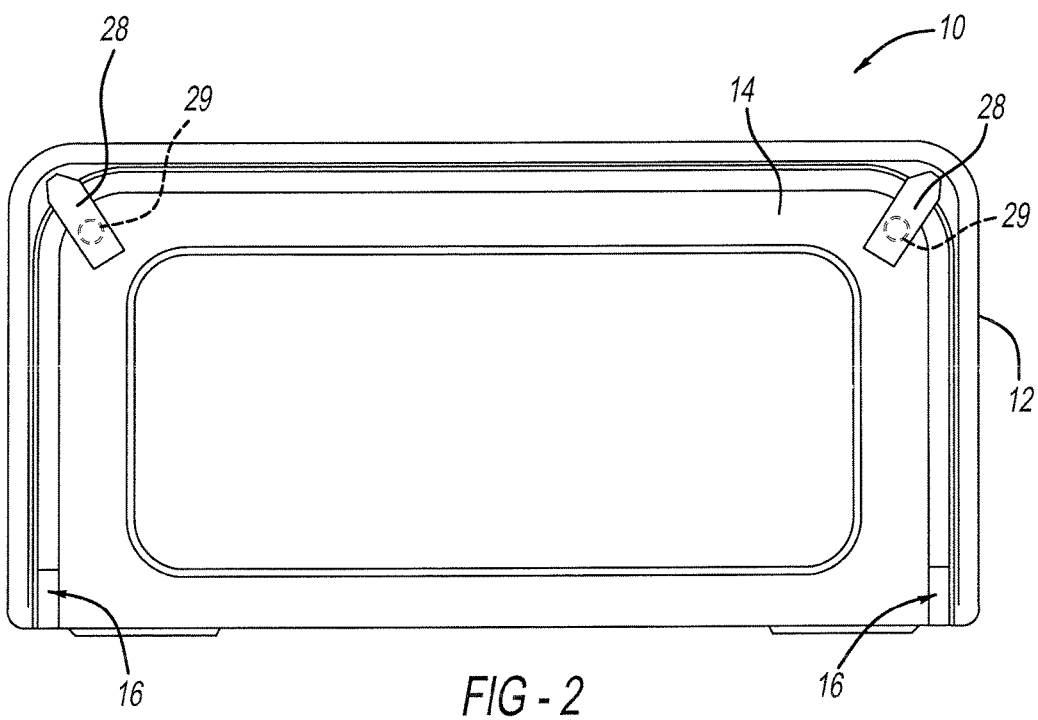
FIG. 2 is a front elevation view of the deployable storage assembly of FIG. 1 with a fastener half depicted in phantom coupled to a base, in accordance with the present invention.
Figure 3:
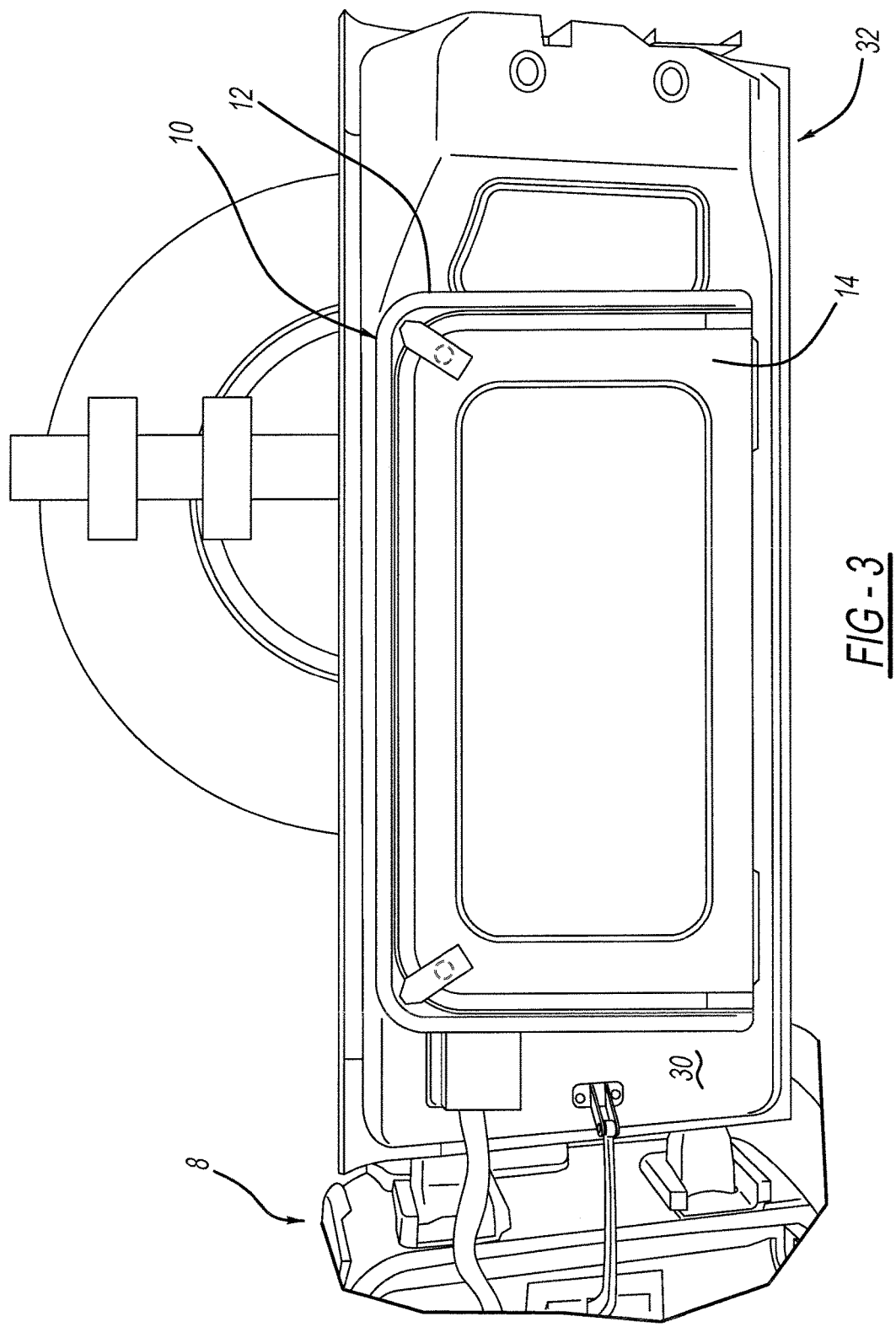
FIG. 3 is a front elevation view of the deployable storage assembly in the closed position and installed on a tailgate of a vehicle, in accordance with the present invention.
Figure 4:
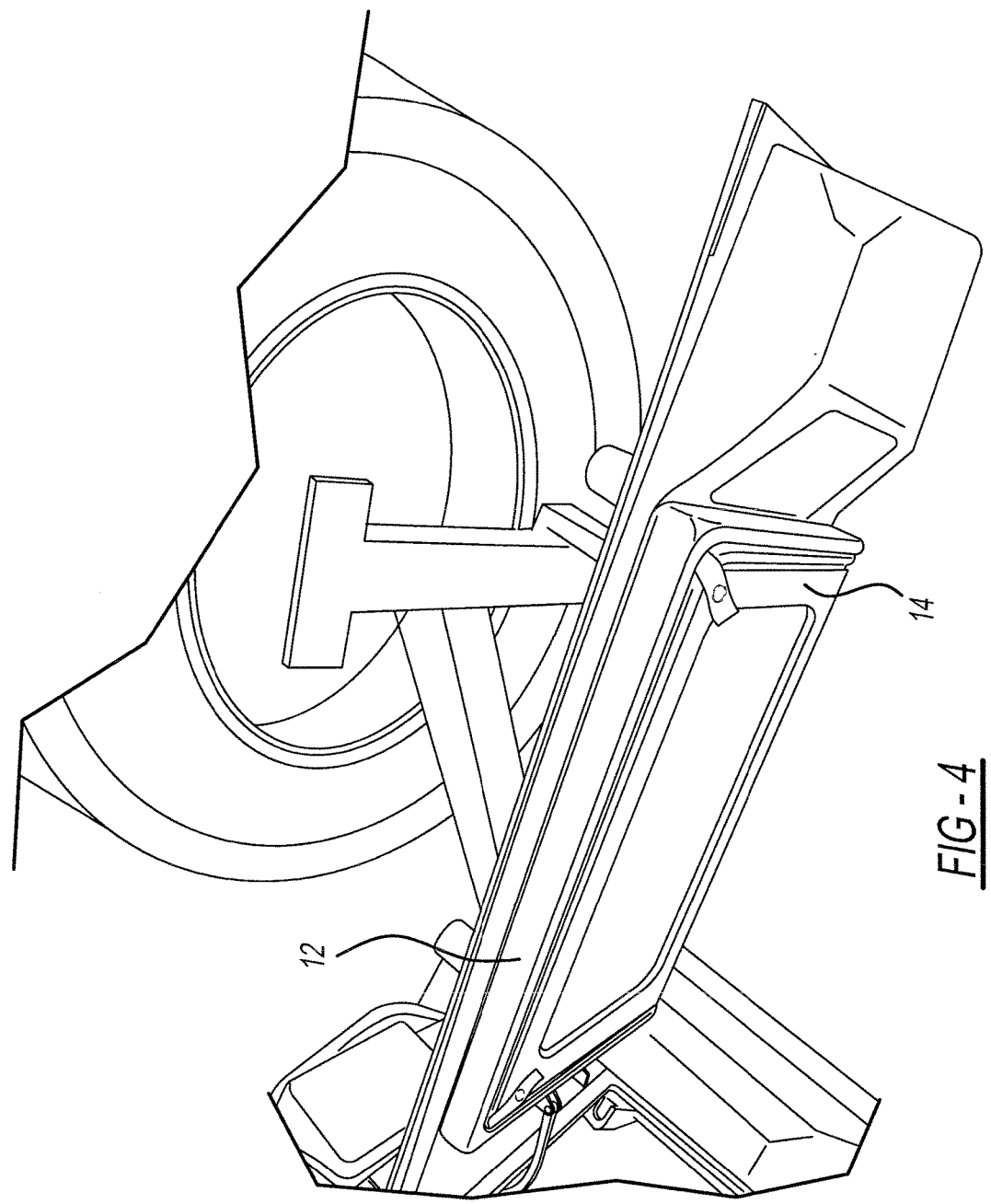
FIG. 4 is a perspective view of the deployable storage assembly in the closed position on the tailgate of the vehicle, in accordance with the present invention.

In further regard to FIGS. 1-2 (uninstalled) and FIGS. 3-4 (installed on the tailgate of the vehicle 8), there is depicted the deployable storage assembly 10 in a closed/stowed position with the fasteners 28 snapped, which when stowed away substantially maintains the original cargo area volume. In further regard to FIG. 7, the tailgate 32 maintains full function and closes completely with the deployable storage assembly 10 in the open position.

In further regard to FIGS. 5-8, there is depicted the deployable storage assembly 10 installed on the tailgate of the vehicle 8 and in an open/deployed position for creating the storage compartment for storing items. To open the deployable storage assembly 10 the fasteners 28 are undone, e.g., undo the snaps to fold open the base, and the base 14 folds open about the hinges 16 to the open/fully deployed position. As the base rotates to the open position the frame arrangement 22 coupled to the base 14 moves along with the base 14 until the frame arrangement 22 and retaining device 26 is fully extended/opened up creating the storage compartment 18 area for storage of items.

Undoing the snaps allows the base to fold down to the open position and the dimensions and configuration of the frame arrangement 22 assists with supporting the base 14 when open and keeping the base from over extending below the open position.

Optionally, at least one flange, tab or other suitable feature is provided, e.g., integrally formed toward the bottom edge of the mounting portion 12, to act as a stop to assist with keeping the base from over extending to below the open position. The frame arrangement may also incorporate a pair of linkage assemblies for deploying between the open and closed position. The base 14 stays in the open position by weight and gravity. It is further contemplated that the frame arrangement 22 is also provided with a snap in place feature or other suitable feature to assist in keeping the assembly 10 in the open position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deployable storage assembly for a vehicle, comprising:
   at least one mounting portion;
   at least one base operably connected to the mounting portion and rotatable between an open position and a closed position;
   at least one frame arrangement supporting a storage compartment when the at least one base is in the open position, wherein the frame arrangement is operably pivotably connected to the mounting portion for pivotable movement as the base is moved between the open and closed positions;
   a pair of brackets, wherein the brackets provide the pivotable connection between the frame arrangement and the mounting portion;
   at least one fastener operably connected to the at least one mounting portion and the at least one base to selectively hold the at least one base in the closed position; and
   said frame arrangement further comprising
   a top rail that is curved and pivotably connected at both ends to the respective bracket;
   a pair of vertical members operably connected to the top rail and operably pivotably connected to the base;
   a first side portion operably connected to the mounting portion and operably connected to the base;
   a second side portion operably connected to the mounting portion and operably connected to the base; and
   a retaining device operably connected to the top rail, pair of vertical members, first side portion, second side portion, and/or the base, wherein the retaining device and frame arrangement are foldable with the base between the open position and closed position.

2. The deployable storage assembly of claim 1, wherein the mounting portion is operably connected to a tailgate of a vehicle.

3. The deployable storage assembly of claim 2, wherein the deployable storage assembly when in the closed position maintains cargo area storage volume.

4. The deployable storage assembly of claim 3, wherein the deployable storage assembly when in the open position allows the tailgate to maintain full function and close completely.

5. The deployable storage assembly of claim 4, further comprising a pair of hinges rotatably connecting the base to the mounting portion.

6. The deployable storage assembly of claim 5, further comprising at least one retaining device operably coupled to the at least one frame arrangement to contain items within the storage compartment.

7. The deployable storage assembly of claim 6, wherein the retaining device is selected from the group consisting of netting, canvas, vinyl, and fabric.

8. The deployable storage assembly of claim 7, wherein the retaining device is netting operably coupled to the frame arrangement.

9. The deployable storage assembly of claim 8, wherein the retaining device is operably coupled to the base and moves with the base as the base is moved between the open and closed positions.

10. The deployable storage assembly of claim 9, wherein the retaining device is operably coupled to the mounting device by a plurality of fasteners.

11. The deployable storage assembly of claim 1, wherein the pair of vertical members are operably connected to freely rotate relative to the base and top rail.

12. The deployable storage assembly of claim 11, further comprising bosses provided on the base for the pivotable connection between the pair of vertical members and the base, and second bosses on the top rail operable to pivotably connect the pair of vertical members to the top rail.

13. The deployable storage assembly of claim 1, wherein the mounting portion and base are lightweight molded plastic to minimize weight to a tailgate to which the deployable storage assembly is operably attached.

14. The deployable storage assembly of claim 1, wherein the at least one fastener is a strap fixedly connected to the mounting portion and releasably snapped to the base.

15. A deployable storage assembly for a tailgate of a vehicle, comprising:
  at least one mounting portion operably connected to a tailgate;
  a base connected to the mounting portion by at least two hinges and rotatable between an open position and a closed position;
  at least one frame arrangement having netting coupled to at least a top rail forming a storage compartment when the base is in the open position; and
  at least two fasteners operably connected to the at least one mounting portion and to the base to selectively hold the base in the closed position;
  wherein when in the closed position the deployable storage assembly maximizes cargo area storage volume, and when in the open position allows the vehicle tailgate to close.

16. A deployable storage assembly for a vehicle, comprising:
  at least one mounting portion;
  at least one base operably connected to the mounting portion and rotatable between an open position and a closed position;
  at least one frame arrangement supporting a storage compartment when the at least one base is in the open position; and
  at least one fastener operably connected to the at least one mounting portion and the at least one base to selectively hold the at least one base in the closed position, wherein the at least one fastener is a strap fixedly connected to the mounting portion and releasably snapped to the base.

17. The deployable storage assembly of claim 16, further comprising at least one retaining device operably coupled to the at least one frame arrangement to contain items within the storage compartment.

18. The deployable storage assembly of claim 17, wherein the retaining device is selected from the group consisting of netting, canvas, vinyl, and fabric.

19. The deployable storage assembly of claim 18, wherein the retaining device is netting operably coupled to the frame arrangement.

20. The deployable storage assembly of claim 16, wherein the mounting portion and base are lightweight molded plastic to minimize weight to a tailgate to which the deployable storage assembly is operably attached.

* * * * *